June 14, 1949.   C. ADAMS, JR   2,473,045
PIPE FITTING
Filed Dec. 21, 1944
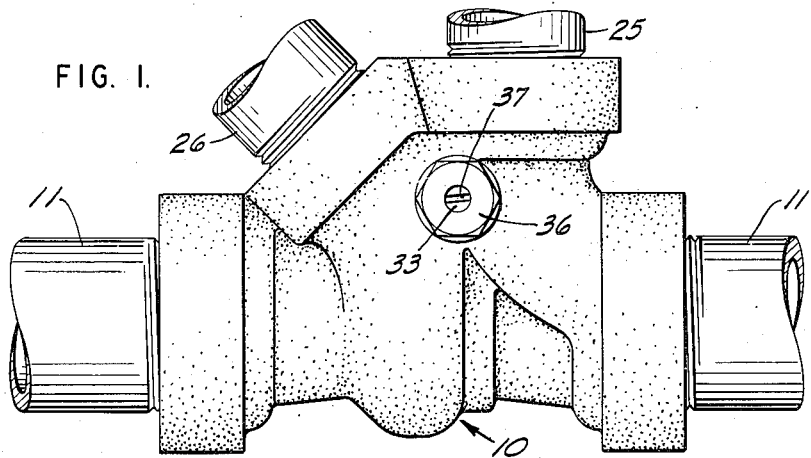
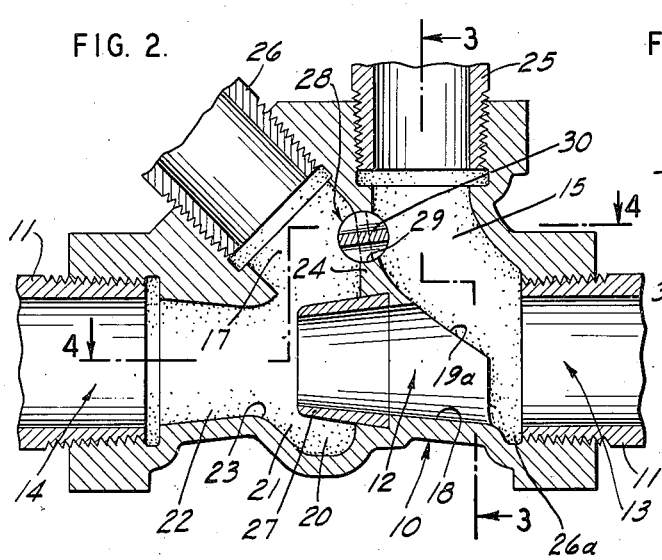
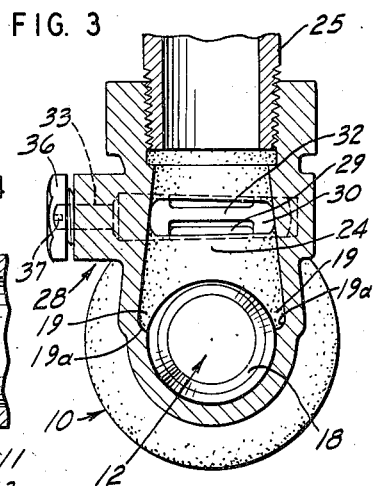
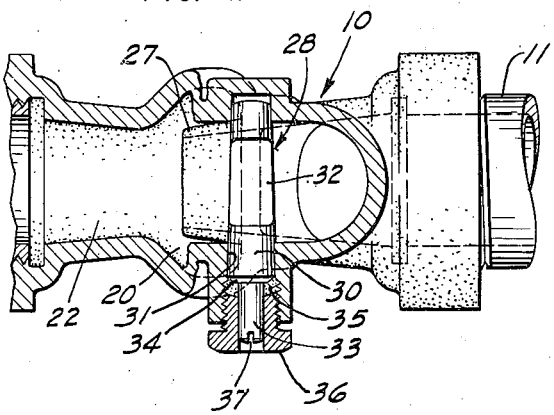
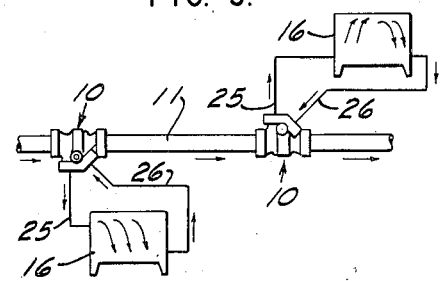
INVENTOR.
CHARLES ADAMS JR.
BY
HIS ATTORNEY Patented June 14, 1949

2,473,045

UNITED STATES PATENT OFFICE 2,473,045

PIPE FITTING

Charles Adams, Jr., Croton on Hudson, N. Y.

Application December 21, 1944, Serial No. 569,157

3 Claims. (Cl. 237—59)

The present invention relates to pipe fittings and more particularly to a novel double-flow fitting especially adapted for use in a circulating main to supply temperature controlling fluid from a main flow to heat-exchanging means and return said temperature controlling fluid to the main flow. Such action may take place in a heat transfer system such as a hot water heating system and each fitting may be used in connection with a single radiator or with a group of radiators. The present invention involves improvements on the pipe fitting described and claimed in my prior Patent No. 2,308,482, granted January 19, 1943.

In the fitting of said prior patent, there is a straight main passage therethrough having a generally reducing taper extending from its main inlet a substantial portion of the distance to the outlet and an outlet portion with an expanding taper. Between these tapered portions is a generally peripheral channel to receive from a return branch fluid supplied to one or more radiators through a supply branch connected to the main passage at the portion having the reducing taper. Fluid may be diverted to said supply branch by means of a scoop having a substantially U-shaped knife or splitting edge and comprising branches starting at opposite sides of the main passage and curving forwardly and outwardly into the inlet end of the supply branch. Diversion of fluid to said supply branch depends upon the velocity of flow in the main passage, rather than upon pressure. This arrangement assures lower friction losses in the corresponding portion of the system than those encountered in prior devices.

Heretofore balancing of a hot water heating system has been effected by setting of valves adjacent to the radiators in suitable manner to assure the required amounts of hot water to be passed through each radiator. Obviously it would be distinctly advantageous to have the regulating devices arranged along a circulating main.

An important object of the present invention is to provide a pipe fitting of the general character specified whereby improved operation of a heat transfer system may be attained.

Another object of the invention is to provide a pipe fitting whereby friction losses in a heat transfer system may be reduced as compared with those systems equipped with prior pipe fittings.

Still another object of the invention is to provide a pipe fitting for use in a circulating main adapted to divert the fluid from the entrance end and restore the fluid to the discharge end of the pipe fitting, and to regulate the amount diverted from the entrance end of the fitting.

Yet another object is to provide in a pipe fitting of the character described means for varying the amount of fluid supplied from the entrance end of the fitting to heat exchanging means and then returned to the outlet end of the main passage of the fitting.

A further object of the invention is to provide a pipe fitting of the character described having therein a connection or shunt between the supply branch and the return branch and means for controlling the passage of fluid through said shunt.

The fitting in which the invention is embodied is designed to reduce losses due to friction and to provide for economical and superior construction. For example, the amount of machining may be reduced by placing a generally conical metal sleeve on the core and casting the metal of the pipe fitting around the larger end of the sleeve to hold it in place.

Besides providing a pipe fitting in which all of the interior surfaces are so shaped as to assure low friction losses the wall between the supply branch and the return branch is provided with a shunt valve whereby by regulation of the valve a desired amount of fluid may pass from the supply branch to the return branch thus reducing the flow of fluid to a radiator or radiators supplied through said supply branch. By use of this feature, balancing of the flow to different radiators may be effected at points along one or more circulating lines.

Other objects, features and advantages will appear upon consideration of the following detailed description and of the drawings in which Fig. 1 is a side elevation of a pipe fitting embodying the present invention;

Fig. 2 is a vertical section of the structure illustrated in Fig. 1;

Fig. 3 is a section along the line 3—3 of Fig. 2;

Fig. 4 is a section along the line 4—4 of Fig. 2; and

Fig. 5 is a fragmentary diagrammatic view of a hot water system, showing the fittings in the most favorable and most unfavorable positions.

Referring to the drawings, there is illustrated in Figs. 1, 2, 3 and 4 a fitting 10 embodying the present invention. Each fitting 10 is connected in a main 11 and in Fig. 5 the fluid as indicated by the arrows flows from left to right through the fittings 10. However, in Figs. 1, 2 and 4 the flow would be from right to left through the fittings 10, each fitting 10 in Fig. 5 being in reverse with respect to the showing in Figs. 1, 2 and 4. The fittings are of double flow type and each has a main passage 12 from main inlet 13 to main outlet 14, a supply branch 15 to supply fluid from the inlet end of the radiator 16 or group of radiators, and a return branch 17 through which fluid, after passing through the radiator or radiators, is returned to the main passage near the main outlet. The flow through a radiator connected with a fitting of this kind is illustrated in Fig. 5.

The main passage 12 has a portion 18 with a reducing taper extending from the main inlet toward the main outlet and serving by increasing the resistance to increase the pressure at the inlet of the supply branch and to force fluid out through the supply branch 15. However, there is also provided novel flow-diverting means in the form of a U-shaped knife-edge scoop which may comprise branches 19 in the form of recesses with inclined shelves 19a at their bottoms, starting at opposite sides of the inlet end of the main passage 12 and substantially at the level of the axis of said main passage and extending forwardly and outwardly and then toward each other until they merge at the intersection of the inner surface of the main passage 12 and the inner surface of the supply branch 15. It will be evident (Figs. 3 and 4) that the U-shaped knife-edge of the scoop splits off a shallow stream from the main flow. The combined action of the reducing taper portion 18 of the main passage 12 with the scoop assures a positive flow into the return branch 17.

The return branch 17 is so located in the fitting that the return fluid enters the mains just beyond the smaller end of the tapered interior of portion 18 of the main passage 12. To distribute the return fluid around the periphery of the main passage, there may be provided a chamber 20 of generally annular form discharging into the main passage 12 through a generally annular slot or passage 21, the walls of the chamber being so shaped and arranged as to direct the flow of the return fluid past a gradually curved portion 23 of the wall of the main passage and forwardly through the passage 21. Just beyond the passage or slot 21 is a portion 22 of the main passage, having an expanding taper extending substantially to the main outlet thus tending to avoid counter currents at the discharge end of the reducing-taper portion 18 of the main passage. There will also be a Venturi or injector action, thus producing a suction on the return branch and acting to increase the flow through the supply branch caused by said scoop.

Preferably the return branch 17 is immediately behind the supply branch 15 longitudinally of the main passage 12 and these branches although separated by a wall 24 are very close together thus enabling the device to be made in compact form. Sections of the circulating main may be fastened to opposite ends of the fitting as by means of screw-threaded connections and in a similar manner a supply line 25 may be connected to the supply branch 15 of the fitting and a return line 26 may be connected to the return branch 17.

The description thus far applies generally to the pipe fitting of my aforesaid prior patent. The following description will, however, apply more directly to the improved pipe fitting of the present invention.

Referring to Fig. 2, it will be seen that fluid entering through the portion of the main at the right of the fitting passes into a groove 26a in the fitting and extending for about 180° around the lower part of the main passage. The cross-section of said groove is such as to cause the fluid to flow smoothly therefrom into the reducing-taper passage 12. Also the branches 19 of the scoop start at or near the level of the axis of the main passage 12 and the bottom of the scoop starts at the branch bottoms 19a in an upwardly and forwardly direction and gradually curves upwardly until it is substantially vertical and straight at the rear surface of the wall 24. On the other hand the rear side of the return passage 17 extends downwardly and rearwardly at the front face of wall 24 and then curves gradually downwardly until it is substantially vertical. This leaves a thin central portion of the wall 24. The return fluid enters the annular passage 20 which is bounded at the inside by the outer surface of a nozzle of which the inner surface is a part of the inwardly-tapered portion 18 of the main passage 12. This nozzle 27 has a thin wall and thus permits an increase in the cross-sectional area of the passage 20 without increasing the outside dimensions of the fitting. It would be difficult to provide such a thin nozzle as a part of a casting. According to the present invention a structure of this kind is produced by taking a nozzle insert or nozzle 27 preferably of cast iron, using it as part of a core and casting the metal of the fitting thereabout, the arrangement being such that only the large end of the nozzle is held by the metal of the body of the fitting.

In a hot water heating system such as that in connection with which the invention is specifically disclosed, the system must be balanced by suitable means to assure the proper flow of hot water to each radiator. Heretofore such balancing or regulation has been effected by restricting the flow through one or more supply lines 25, as by means of a control device or valve in each of said lines. Such valves are intended to be set permanently and are entirely independent of any ordinary shut-off valves.

According to the present invention such balancing of flow may be effected by means of a shunt valve 28 controlling the flow of the hot fluid from supply branch 15 through a shunt passage 29 to return branch 17. The movable valve member 30 is slightly tapered and its smaller end fits at one side of the fitting in a corresponding round recess closed at its outer end. The larger end of valve member 30 fits in a corresponding round bore 31 extending to the outside of the fitting. The opening in which the tapered valve member 30 turns is of course tapered accordingly.

Between its bearing portions the valve member 30 is cut away at opposite sides to provide a flat central portion 32 with rounded edges to cooperate in sealing relation with the edges of the shunt passage 29 when the valve is closed. Obviously the shunt passage may be opened by turning the valve member 30 away from its sealing position shown in dashed lines in Fig. 2, the maximum opening being obtained when the flat central portion 32 is in the position shown in full lines in Fig. 2.

At its large end the valve member 30 is reduced in size to provide a stem 33 separated from the larger part by a tapered shoulder 34 for engagement by a sealing washer 35 which is subjected to pressure between said shoulder 34 and the inner end of a packing gland member 36 provided with a central opening receiving the stem 33. The outer end of the stem lies within the packing gland but is provided at its outer end with a slot 37 so that the position of valve member may be varied by use of a suitable implement such as a screw driver.

In the usual heating systems, there is a fitting through which heated fluid is supplied to a radiator or a riser connection and a T through which the fluid is returned to the main. Double flow fittings such as that of the present invention eliminate the separate return T's and reduce resistance or friction in the system. Furthermore the suction acting on the return branch combined with the means for diverting fluid from the main to the supply branch serves to reduce resistance as compared with prior double flow fittings. The fitting of the present invention is especially adapted for minimizing resistance to fluid passing therethrough.

The knife edge U scoop cuts off and deflects enough of the main flow into the supply branch 15 and with sufficient force or velocity to supply the necessary heat units to a radiator or radiators without substantial change in temperature, thus providing maximum radiation efficiency with less back pressure.

In balancing a system of the general class under consideration, it may be necessary to reduce the flow of hot fluid through a radiator. Heretofore, it has been the general practice to effect such reduction by means of a suitable valve at the radiator. Reduction of flow in this way would increase very materially the resistance to flow through the radiator and its supply and return lines. However, by use of the shunt passage and its valve, there is no increase of resistance in the radiator and its supply and return lines, and the resistance due to flow through the shunt passage will be rather small.

It should be understood that various changes may be made and that certain features may be used without others, without departing from the true spirit and scope of the invention.

Having thus described my invention, I claim:

1. A pipe fitting comprising a body having a main inlet and a main outlet for connection in a circulating main of a heat-transfer system, a main passage connecting said inlet and outlet, a supply branch leading from said main passage near said inlet to supply fluid to heat transfer means, means for diverting fluid from the inlet end of said main passage to said supply branch, means including a return branch to return fluid from said heat transfer means to said main passage beyond said supply branch, a wall separating the supply branch and the return branch and having a shunt passage connecting said branches, and a valve extending across said passage for controlling the flow of water therethrough.

2. The combination according to claim 1 wherein said valve comprises a valve member having a flat portion shaped at its edges to seal said passage when in closed position and mounted to turn about an axis of symmetry of said flat portion.

3. The combination according to claim 1 wherein said passage has an elongated cross-section and said valve comprises a pivotally mounted elongated valve member having a flat portion with side edges rounded about the pivotal axis to fit against correspondingly rounded inner surfaces of said passage.

CHARLES ADAMS, Jr.

REFERENCES CITED

The following references are of record in the file of this patent:

UNITED STATES PATENTS

| Number | Name | Date |
|---|---|---|
| 323,458 | Smith et al. | Aug. 4, 1885 |
| 2,304,642 | Hans | Dec. 8, 1942 |
| 2,308,482 | Adams | Jan. 19, 1943 |